US012149522B2

(12) United States Patent
Levy et al.

(10) Patent No.: US 12,149,522 B2
(45) Date of Patent: Nov. 19, 2024

(54) PERFORMANCE OF USER OPERATIONS BY A FIRST SYSTEM ON A SECOND SYSTEM USING USER IMPERSONATION (71) Applicant: Dell Products L.P., Round Rock, TX (US)

(72) Inventors: Shoham Levy, Ra'anana (IL); Mirit Sadon, Kiryat Ono (IL); Haim Shalelashvili, Tirat Carmel (IL)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 17/730,771

(22) Filed: Apr. 27, 2022

(65) Prior Publication Data

US 2023/0353556 A1 Nov. 2, 2023

(51) Int. Cl.
*H04L 9/40* (2022.01)

(52) U.S. Cl.
CPC ........ *H04L 63/083* (2013.01); *H04L 63/1483* (2013.01)

(58) Field of Classification Search
CPC ............... H04L 63/083; H04L 63/1483; H04L 63/0807; H04L 63/0815
See application file for complete search history.

(56) References Cited

U.S. PATENT DOCUMENTS

| 2012/0017269 | A1* | 1/2012 | Cahill | G06Q 10/10 726/9 |
| 2019/0103968 | A1* | 4/2019 | Srinivasan | H04L 9/0894 |
| 2019/0238598 | A1* | 8/2019 | Mohamad Abdul | H04L 63/0807 |
| 2020/0021573 | A1* | 1/2020 | Kondarev | G06F 21/41 |
| 2023/0164131 | A1* | 5/2023 | G | H04L 63/0815 726/4 |

OTHER PUBLICATIONS

"Managing Impersonation", https://hts.c2b2.columbia.edu/help/docs/ap_help/content/ap_help/security/impersonation.htm; downloaded on Apr. 25, 2022.
https://docs.microsoft.com/en-us/windows/security/threat-protection/security-policy-settings/impersonate-a-client-after-authentication; downloaded on Apr. 25, 2022.
Koussa, Sherif; "Differentiating Federated Identities: OpenID Connect SAML v2.0 and OAuth 2.0", dated Jun. 6, 2017; https://www.softwaresecured.com/differentiating-federated-identities-openid-connect-saml-v2-0-and-oauth-2-0/; downloaded on Apr. 25, 2022.

* cited by examiner

*Primary Examiner* — Henry Tsang
(74) *Attorney, Agent, or Firm* — Ryan, Mason & Lewis, LLP (57) ABSTRACT

Techniques are provided for performing user operations by a first system on a second system using user impersonation. One method comprises receiving, by a first system, a log in of a user to the first system and an operation to be performed by a second system; sending an impersonation request, by the first system to the second system, to obtain an impersonated user access token of the given user for the second system; receiving, by the first system from the second system, in response to the impersonation request, the impersonated user access token of the given user; and providing, by the first system to the second system, the operation with the impersonated user access token of the given user, wherein the second system performs the operation based at least in part on a result of an access validation of the impersonated user access token of the given user.

20 Claims, 8 Drawing Sheets

BACK END-BASED PROCESS FOR MANAGEMENT SERVER IMPERSONATION OF USER ON WEB APPLICATION OF TARGET SERVER

1. MANAGEMENT SERVER EXECUTES PORTIONS OF PROCESS OF FIG. 3 FOR MANAGEMENT SERVER IMPERSONATION OF A USER ON A TARGET SERVER TO OBTAIN A TEMPORARY PKCE (PROOF KEY FOR CODE EXCHANGE) TOKEN AS THE IMPERSONATED USER ACCESS TOKEN, WHERE AT LEAST ONE OF THE OPERATIONS RECEIVED FROM THE USER COMPRISES A REQUEST TO ACCESS A WEB PAGE OF THE TARGET SERVER

2. MANAGEMENT SERVER REDIRECTS WEB BROWSER OF USER TO A WEB APPLICATION OF THE TARGET SERVER USING A REDIRECT CALL THAT COMPRISES A CALLBACK UNIFORM RESOURCE LOCATOR OF THE TARGET SERVER WITH THE PKCE TOKEN

3. WEB APPLICATION OF THE TARGET SERVER PROVIDES PKCE TOKEN TO BACK-END PORTION OF WEB APPLICATION

4. BACK-END PORTION OF WEB APPLICATION SENDS PKCE TOKEN TO IDENTITY, ACCESS AND IMPERSONATION MODULE 152 TO OBTAIN A WEB ACCESS TOKEN FOR USER THAT WILL BE USED BY BACK-END PORTION OF WEB APPLICATION

5. WEB APPLICATION OF THE TARGET SERVER OPENS TO THE WEB PAGE IN A NEW TAB WITH THE USER LOGGED IN AND READY TO PERFORM ONE OR MORE WEB OPERATIONS ON THE WEB APPLICATION

PERFORMANCE OF USER OPERATIONS BY A FIRST SYSTEM ON A SECOND SYSTEM USING USER IMPERSONATION

FIELD

The field relates generally to information processing systems and more particularly, to the performance of user operations in such systems.

BACKGROUND

When a first system wishes to perform one or more user operations on behalf of a user on a second system (e.g., when the first system is acting as an agent of the user), the user must typically log into the second system to obtain an authorization to operate on the second system. The first system may receive an authorization token from the second system that allows the first system to perform the one or more user operations on the second system on behalf of the user.

A need exists for improved techniques for allowing one system to perform one or more user operations on behalf of a user on another system.

SUMMARY

In one embodiment, a method comprises receiving, by a first system from a given user, a log in of the given user to the first system; receiving, by the first system from the given user, one or more operations to be performed by a second system; sending an impersonation request, by the first system to the second system, to obtain an impersonated user access token of the given user for the second system; receiving, by the first system from the second system, in response to the impersonation request, the impersonated user access token of the given user for the second system; and providing, by the first system to the second system, the one or more operations, with the impersonated user access token of the given user for the second system, wherein the second system performs the one or more operations based at least in part on a result of an access validation of the impersonated user access token of the given user for the second system.

In some embodiments, the sending the impersonation request further comprises providing, by the first system to the second system, a first system user access token, issued by the first system in response to the given user logging in to the first system, of the given user. In addition, the access validation may comprise validating an impersonator user access token of the first system that allows the first system to impersonate a plurality of users on the second system and has a duration that exceeds a session of the given user.

In one or more embodiments, the one or more operations comprise a request of the given user to access a web page on the second system. The method may further comprise redirecting, by the first system, a web browser of the given user to a web application of the second system using a redirect call that comprises the impersonated user access token of the given user and wherein the web application of the second system opens to the web page in the web browser of the given user, such that the given user performs one or more user web operations on the web application. In addition, the impersonated user access token of the given user may comprise a proof key for code exchange token and the method may further comprise redirecting, by the first system, a web browser of the given user to a web application of the second system using a redirect call that comprises a callback uniform resource locator of the second system with the proof key for code exchange token, wherein the web application of the second system provides the proof key for code exchange token to a back end portion of the web application of the second system, wherein the back end portion of the web application of the second system sends the proof key for code exchange token to an identity service of the second system to obtain a web access token for the given user, and wherein the web application of the second system opens to the web page in the web browser, such that the given user performs one or more web user operations on the web application of the second system.

In at least one embodiment, the first system uses an identity service that is different than an identity service of the second system.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for performing user operations by a first system on a second system using user impersonation.

One or more aspects of the disclosure recognize that when two or more systems share the same Identity Provider (IDP), for example, in a single-sign on environment, the need for the user to obtain an authorization token can be avoided, and the user can experience a seamless operation between the two systems. When the two or more systems, however, do not share the same IDP, the user currently must first log in to any systems where the operations will be performed.

In one or more embodiments, techniques are provided for performing user operations by a first system (e.g., a manager, portal or another system that needs to access, activate and/or connect to other systems on behalf of a user) on at least a second system using user impersonation (e.g., in the absence of a common IDP). For example, a management system may need to control one or more additional systems to perform one or more user operations on the one or more additional systems, on behalf of one or more users. In at least some embodiments, the disclosed techniques for user impersonation provide an automated method to achieve trust between the different systems. In this manner, the user does not need to manually create trust between the additional systems by logging in to each of the managed systems (at least once). In addition, in some embodiments, a central web graphical user interface (GUI) of a first system can redirect a browser of a user to one or more web GUIs of other systems. With many existing solutions, the user would have to login at least once for each redirect operation.

In one exemplary implementation, a given user may log into a first system, such as a management system. The given user then initiates at least one operation on the first system that, in turn, needs to be performed on the second system. Rather than having the given user authenticate to the second system, the first system logs into the second system, using an impersonation privileged user, and requests to impersonate the user. The first system receives an impersonated user access token for the given user for the second system that allows the first system to perform the at least one operation on the second system on behalf of the given user.

Figure 1:
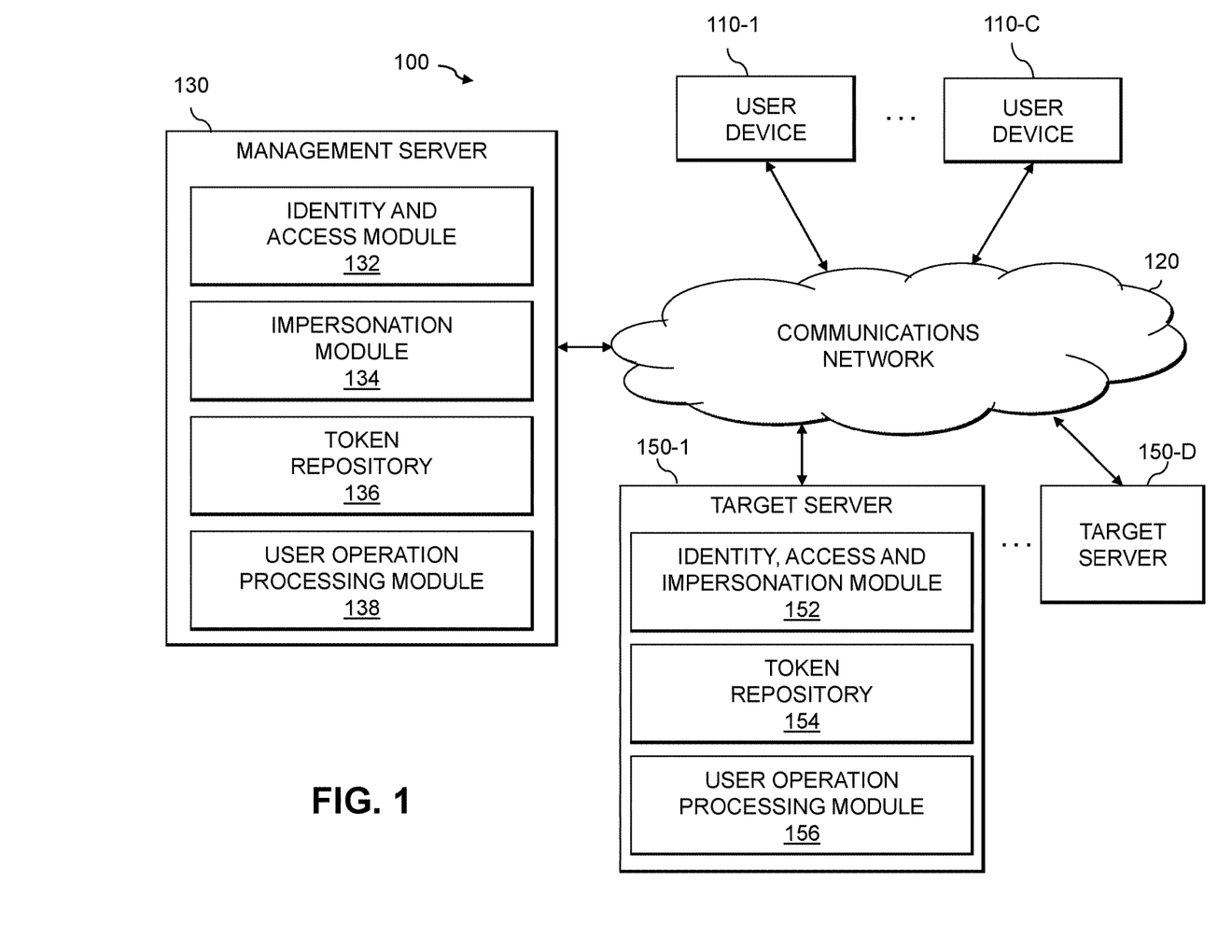
FIG. 1 illustrates an information processing system configured for performing user operations by a first system on a second system using user impersonation in accordance with an illustrative embodiment.

FIG. 1 shows an information processing system 100 configured in accordance with an illustrative embodiment. The information processing system 100 comprises a plurality of user devices 110-1 through 110-C, collectively referred to herein as user devices 110. The information processing system 100 further comprises one or more management servers 130 and one or more target servers 150-1 through 150-D, collectively referred to herein as target servers 150, discussed below.

The user devices 110 may comprise, for example, host devices and/or devices such as mobile telephones, laptop computers, tablet computers, desktop computers or other types of computing devices (e.g., virtual reality (VR) devices or augmented reality (AR) devices). Some of these processing devices are also generally referred to herein as "computers." The user devices 110 may comprise a network client that includes networking capabilities such as ethernet, Wi-Fi, etc.

One or more of the user devices 110, the management servers 130 and/or the target servers 150 may be coupled to a network 120, where the network 120 in this embodiment is assumed to represent a sub-network or other related portion of a larger computer network. The network 120 is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network 120 in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the user devices 110, the management servers 130 and/or the target servers 150 illustratively comprise processing devices of one or more processing platforms. For example, the management server 130 can comprise one or more processing devices each having a processor and a memory, possibly implementing virtual machines and/or containers, although numerous other configurations are possible. The processor illustratively comprises a microprocessor, a microcontroller, a central processing unit (CPU), a graphics processing unit (GPU), a tensor processing unit (TPU), an application-specific integrated circuit (ASIC), a field-programmable gate array (FPGA) or other type of processing circuitry, as well as portions or combinations of such circuitry elements.

One or more of the user devices 110, the management servers 130 and/or the target servers 150 can additionally or alternatively be part of edge infrastructure and/or cloud infrastructure such as an Amazon Web Services (AWS) system. Other examples of cloud-based systems that can be used to provide at least portions of the user devices 110, the management servers 130 and/or the target servers 150 include Google Cloud Platform (GCP) and Microsoft Azure.

As shown in FIG. 1, the exemplary management server 130 comprises an identity and access module 132, an impersonation module 134, a token repository 136 and a user operation processing module 138, as discussed further below. In one or more embodiments, the identity and access module 132 may be used, for example, to perform one or more authentication and/or authorization evaluations tasks, for example, in accordance with OpenID Connect (OIDC), OAUTH2 (Open Authorization 2.0) and/or Security Assertion Markup Language (SAML) access control techniques, as modified herein to provide the features and functions of the disclosed user impersonation techniques. Inter IDP solutions, such as OAUTH2, for example, are normally employed for a one-to-one relation between a first system and a second system and typically require the user to log in to both systems. The disclosed user impersonation techniques are suitable for one-to-one and one-to-many use cases, as would be apparent to a person of ordinary skill in the art.

In the example of FIG. 1, the impersonation module 134 may be used to register the management server 130 registration as a privileged impersonator user with one or more of the target servers 150 and to implement at least some of the user impersonation techniques described herein. In addition, the exemplary token repository 136 stores one or more tokens, for example, of at least one user, and of the management server 130 that are used in connection with the disclosed techniques for performing user operations by the management server 130 on one or more of the target servers 150 using user impersonation. The user operation processing module 138 may be employed in at least some embodiments to receive one or more user operations from a given user of a user device 110, to coordinate the performance of such user operations on one or more of the target servers 150 and/or to provide any results associated with such user operations to the given user.

It is to be appreciated that this particular arrangement of elements 132, 134, 136, 138 illustrated in the management server 130 of the FIG. 1 embodiment is presented by way of example only, and alternative arrangements can be used in other embodiments. For example, the functionality associated with elements 132, 134, 136, 138 in other embodiments can be combined into a single element, or separated across a larger number of elements. As another example, multiple distinct processors and/or memory elements can be used to implement different ones of elements 132, 134, 136, 138 or portions thereof. At least portions of elements 132, 134, 136, 138 may be implemented at least in part in the form of software that is stored in memory and executed by a processor.

The management server 130 may further include one or more additional modules and other components typically found in conventional implementations of such devices, although such additional modules and other components are omitted from the figure for clarity and simplicity of illustration.

In the FIG. 1 embodiment, the management server 130 is assumed to be implemented using at least one processing platform, with each such processing platform comprising one or more processing devices, and each such processing device comprising a processor coupled to a memory. Such processing devices can illustratively include particular arrangements of compute, storage and network resources.

As shown in FIG. 1, the exemplary target server 150-1 comprises an identity, access and impersonation module 152, a token repository 154 and a user operation processing module 156, as discussed further below. Any additional target servers 150, such as target server 150-D may be implemented in a similar manner as the exemplary target server 150-1.

In one or more embodiments, the identity, access and impersonation module 152 may be used, for example, to perform one or more authentication and/or authorization evaluations tasks, for example, in a similar manner as the identity and access module 132 of the management server 130. While existing single sign on (SSO) solutions assume a shared IDP between two or more systems, the disclosed user impersonation techniques allow the identity and access module 132 of the management server 130 and the identity, access and impersonation module 152 of the target server 150-1 to employ different IDP providers. The identity and access module 132 of the management server 130 logs into the identity, access and impersonation module 152 of the target server 150-1 in some embodiments as a privileged user that can impersonate one or more users to perform one or more user operations on the target server 150-1. The identity, access and impersonation module 152 may further comprise functionality to register one or more management servers 130 as a privileged impersonator user with the target server 150-1 and to implement at least some of the user impersonation techniques described herein.

The identity, access and impersonation module 152 of the target server 150-1 may also define an impersonator user that allows a given management server 130 to register as a privileged impersonator user, for example, using an impersonation function on the IDP of the target server 150-1. In this manner, a given management server 130 can perform the disclosed user impersonation functions to allow users of the given management server 130 to impersonate at least one other user, and to obtain access tokens as if they were the at least one other user. The identity, access and impersonation module 152 of the target server 150-1 can also ensure that each user is uniquely identified on one or more of the user devices 110, the management server(s) 130 and/or the target server(s) 150, for example, by username, email address or another unique identifier of the user. In this manner, a mapping can be established of the users between the user devices 110, the management server(s) 130 and/or the target server(s) 150 using such as a user identifier.

In the example of FIG. 1, the exemplary token repository 154 stores one or more tokens, for example, of the management server 130 that are used in connection with the disclosed techniques for performing user operations by the management server 130 on the target server 150-1 using user impersonation. The user operation processing module 156 may be employed in at least some embodiments to receive one or more user operations from the management server 130, to perform such user operations on the target server 150-1 and/or to provide any results associated with such user operations to the management server 130.

It is to be appreciated that this particular arrangement of elements 152, 154, 156 illustrated in the target server 150-1 of the FIG. 1 embodiment is presented by way of example only, and alternative arrangements can be used in other embodiments. For example, the functionality associated with elements 152, 154, 156 in other embodiments can be combined into a single element, or separated across a larger number of elements. As another example, multiple distinct processors and/or memory elements can be used to implement different ones of elements 152, 154, 156 or portions thereof. At least portions of elements 152, 154, 156 may be implemented at least in part in the form of software that is stored in memory and executed by a processor.

The representative target server 150-1 may further include one or more additional modules and other components typically found in conventional implementations of such devices, although such additional modules and other components are omitted from the figure for clarity and simplicity of illustration.

In the FIG. 1 embodiment, the representative target server 150-1 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the management server 130 to reside in different data centers. Numerous other distributed implementations of the components of the system 100 are possible.

Also associated with one or more of the user devices 110, the management server 130 and/or the target servers 150 can be one or more input/output devices (not shown), which illustratively comprise keyboards, displays or other types of input/output devices in any combination. Such input/output devices can be used, for example, to support one or more user interfaces to a user device 110, as well as to support communication between the management server 130 and/or the target servers 150 or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for performing user operations by a first system on a second system using user impersonation is presented by way of illustrative example only, and in other embodiments additional or alternative elements may be used. Thus, another embodiment includes additional or alternative systems, devices and other network entities, as well as different arrangements of modules and other components.

Figure 2:
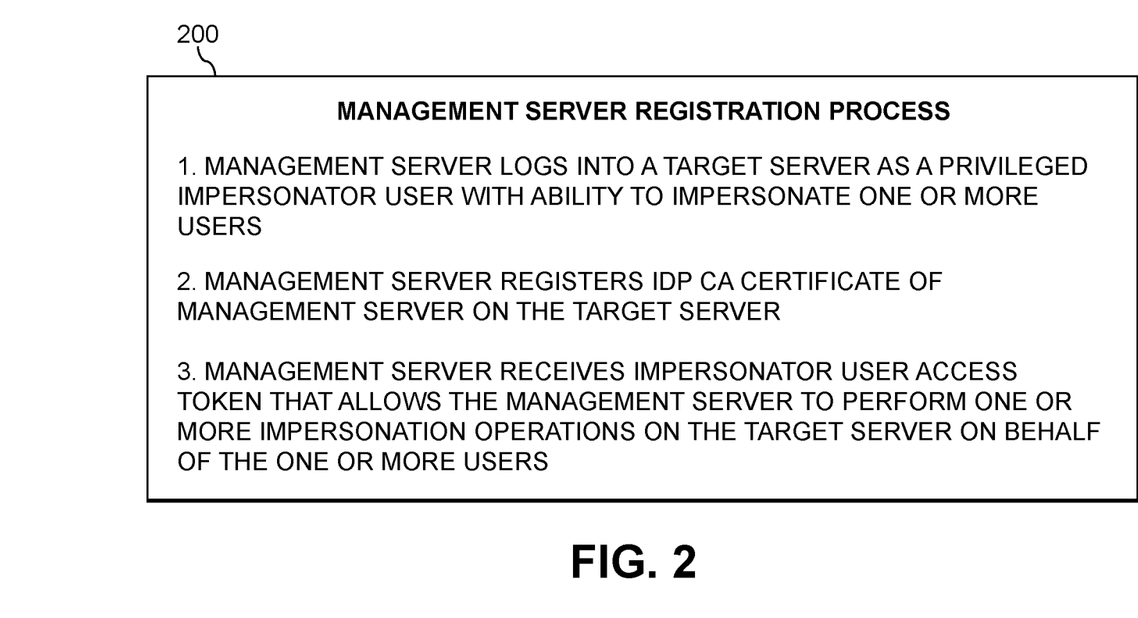
FIG. 2 illustrates exemplary pseudo code for a process for registering a management server with a target server in accordance with an illustrative embodiment.

FIG. 2 illustrates exemplary pseudo code 200 for a process for registering a management server with a target server in accordance with an illustrative embodiment. In the example of FIG. 2, a management server 130 logs into a given target server 150 in step 1 as a privileged impersonator user with an ability to impersonate one or more users. In step 2, the management server 130 may register the IDP CA (Certificate Authority) certificate of the management server 130 on the target server 150. In some embodiments, step 2 is performed, for example, only when a given target server 150 wishes to validate that there is an existing user session with the management server 130 for additional security (e.g., to ensure that the user of user device 110 is logged into the management server 130, and that the transactions are not a casual, or brute force access attempt by the management server 310).

In step 3, the management server 130 receives an impersonator user access token that allows the management server 130 to perform one or more impersonation operations on the target server 150 on behalf of the one or more users. In some embodiments, the impersonator user access token has a duration that may exceed a session of any particular user.

In at least some embodiments, a given management server 130 implements at least portions of the process of FIG. 2 for each different target server 150 where the given management server 130 wishes to perform user operations on behalf of one or more users using the disclosed techniques for user impersonation.

Figure 3:
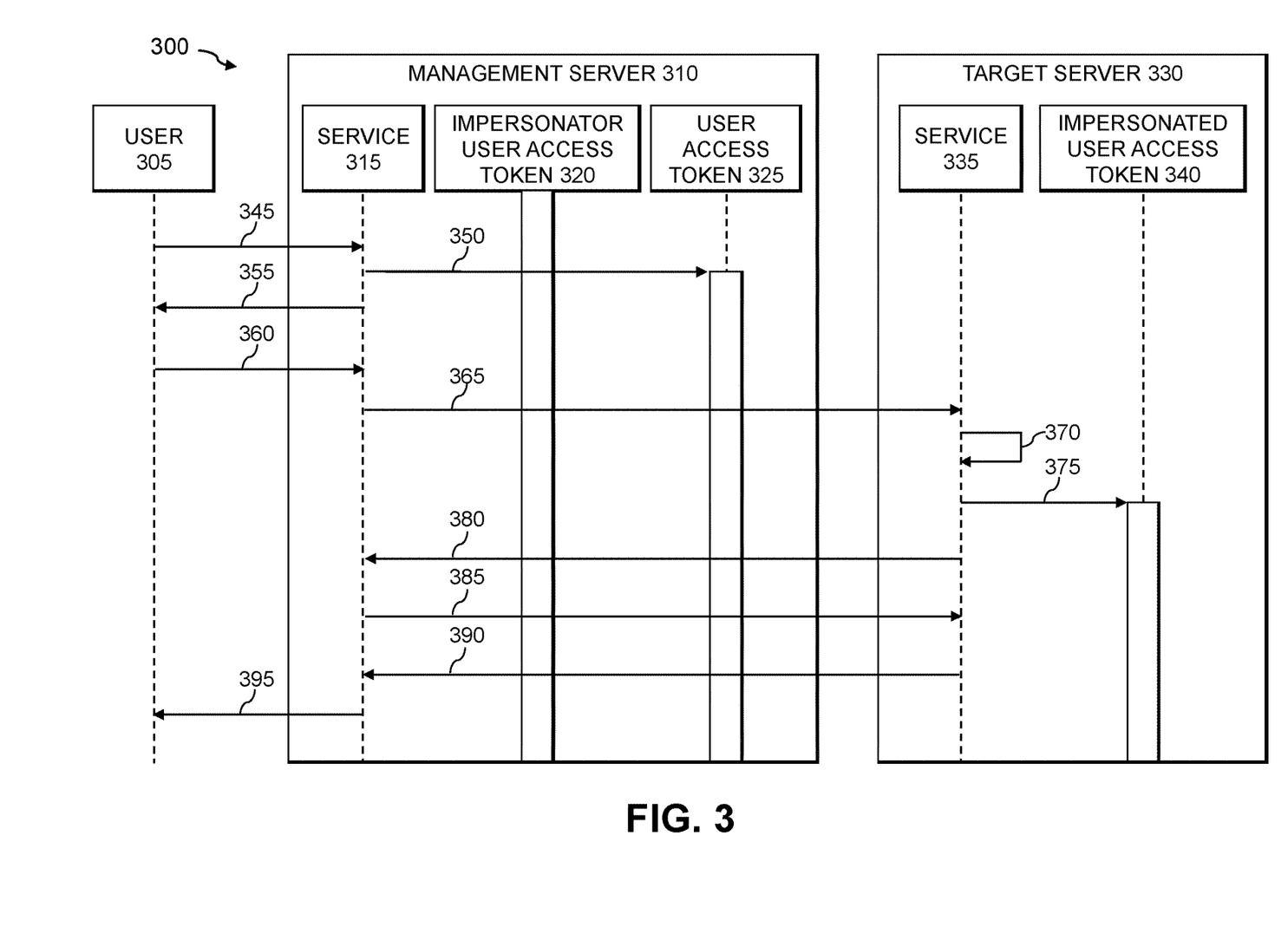
FIG. 3 illustrates an exemplary communication diagram for a management system impersonation of a user to perform one or more operations of the user on a target server in accordance with an illustrative embodiment.

FIG. 3 illustrates an exemplary communication diagram 300 for a management server 310 impersonation of a user 305 to perform one or more operations of the user 305 on a target server 330 in accordance with an illustrative embodiment. In the example of FIG. 3, the user 305 initially logs into the management server 310 in step 345 (for example, by submitting the credentials of the user 305, using a certificate-based login, or another login procedure), using at least one service 315 of the management server 310. If the log in attempt is successful (e.g., the user 305 has the proper authorization), the at least one service 315 will generate a user access token 325 for the user 305 for use on the management server 310 in step 350. The at least one service 315 provides the user access token 325 to the user 305 in step 355. In some embodiments, the provided user access token 325 may be signed by the Identity Provider of the management server 310.

As shown in FIG. 3, the user 305 provides one or more user operations to be performed on the target server 330 to the management server 310 in step 360. In at least some embodiments, the user 305 provides the user access token 325 to the management server 310 with the one or more user operations in step 360.

In the example of FIG. 3, the management server 310 logs into the target server 330 in step 365 and provides an impersonation request to impersonate the user 305 in order to perform the user operations from step 360 on the target server 330. The management server 310 may log into the target server 330 in step 365, for example, by providing a private client login, to directly obtain an impersonated user access token 340, or a public client login that uses an interim key to obtain the impersonated user access token 340 (such as in OAUTH2 PKCE (Proof Key for Code Exchange)).

The user access token 325 may be provided in some embodiments with the impersonation request of step 365. In addition, an impersonator user access token 320 of the management server 310, that allows the management server 310 to impersonate the user 305 (and possibly additional users) on the target server 330. The impersonator user access token 320 may be received by the management server 310 from the target server 330, for example, after the management server 310 registers with the target server 330 using the registration process of FIG. 2.

One or more of the impersonator user access token 320 and the user access token 325 may be stored by the management server 310 in a token repository of the management server 310.

At least one service 335 of the target server 330 validates the received impersonation request of step 365 in step 370. For example, the validation may comprise validating one or more of the user access token 325 and/or the impersonator user access token 320 (or the registered IDP CA certificate from the process of FIG. 2) of the management server 310 that are provided in some embodiments with the impersonation request, as discussed above.

If the validation of step 370 is successful, the at least one service 335 of the target server 330 establishes an impersonated user access token 340 in step 375 that allows the management server 310 to perform one or more operations of the user 305 on the target server 330. In addition, the at least one service 335 of the target server 330 provides the impersonated user access token 340 in step 380 to the at least one service 315 of the management server 310. As noted above, the impersonated user access token 340 allows the management server 310 to perform one or more operations of the user 305 on the target server 330.

One or more of the impersonator user access token 320, the user access token 325 and the impersonated user access token 340 may be stored in some embodiments by (i) the management server 310 in a token repository of the management server 310 and/or (ii) the target server 330 in a token repository of the target server 330. In some embodiments, one or more of the impersonator user access token 320, the user access token 325 and the impersonated user access token 340 may use OAUTH2, OIDC, or SAML techniques, or another certificate-based protocol. One or more of the impersonator user access token 320, the user access token 325 and the impersonated user access token 340 may be refreshed as the respective protocol allows.

In step 385, the at least one service 315 of the management server 310 provides the one or more operations received from the user 305, with the impersonated user access token 340, in step 360 to the at least one service 335 of the target server 330 so that the one or more operations can be performed by the target server 330. In this manner, it appears in at least some embodiments to the target server 330 that the user 305 is issuing the one or more operations. In some embodiments, the at least one service 335 of the target server 330 will perform the one or more operations received in step 385 if the validation of step 370 was successful.

In step 390, the at least one service 335 of the target server 330 can provide a confirmation to the at least one service 315 of the management server 310 that the one or more operations of the user 305 were performed. In addition, the at least one service 315 of the management server 310 can provide a confirmation in step 395 to the user 305 that the one or more operations of the user 305 were performed by the target server 330.

In some embodiments, the target server 330 can enforce, for example, role-based access control (RBAC), restrictions on resources of the target server 330 that the user 305 (or the management server 310 on behalf of the user 305) can access and/or utilize; tenants; and/or additional access rules for the user 305 (or the management server 310 on behalf of the user 305) when processing operations from the management server 310 on behalf of the user 305 using the impersonated user access token 340.

In addition, in one or more embodiments, the authentication of users between the management server 310 and the target server 330 may rely on any authentication method. For example, the authentication method may employ username/password, certificate-based TLS (Transport Layer Security)/mTLS (Mutual TLS), multi-factor authentication, or another secure connection method.

Figure 4:
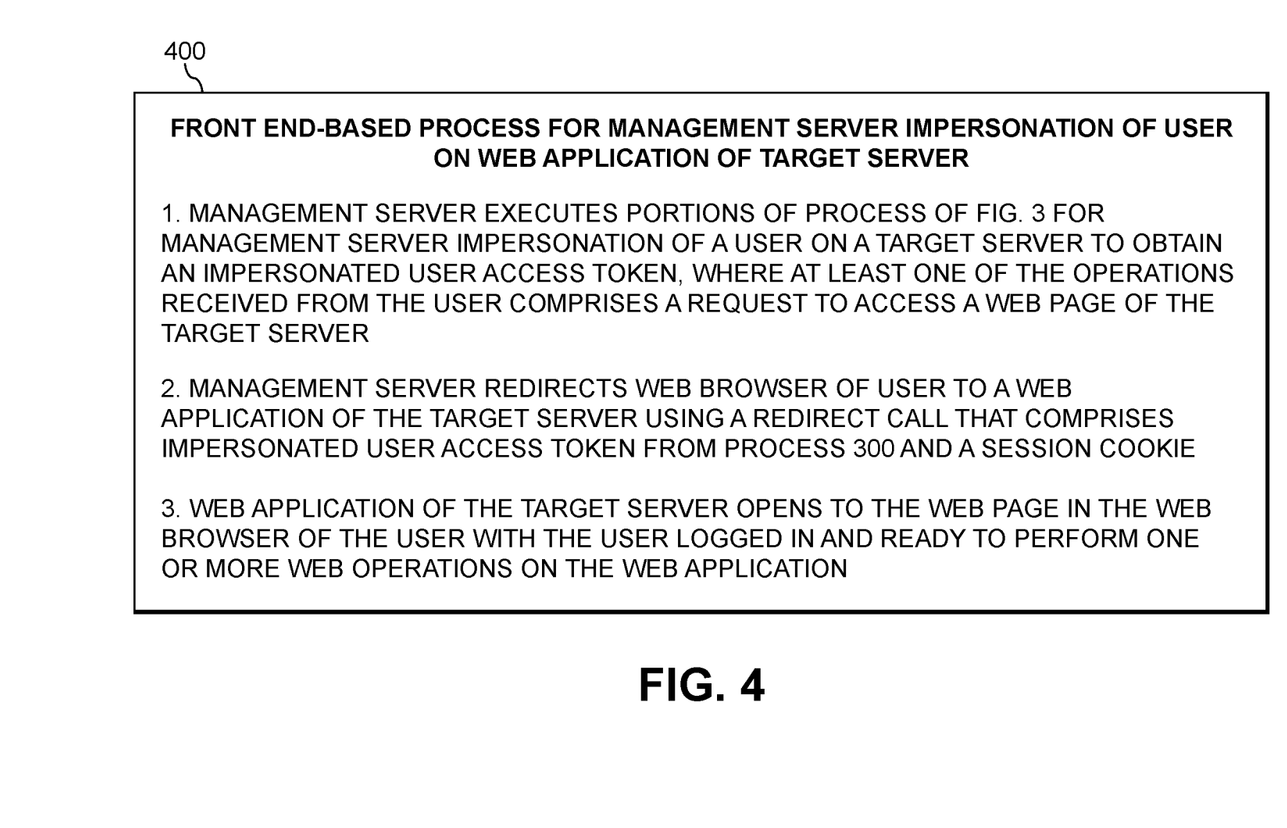
FIG. 4 illustrates exemplary pseudo code for a process for a front end-based management server impersonation of a user on a web application of a target server in accordance with an illustrative embodiment.

FIG. 4 illustrates exemplary pseudo code 400 for a process for a front end-based management server impersonation of a user on a web application of a target server in accordance with an illustrative embodiment. In the example of FIG. 4, the management server 310 executes at least portions of the process of FIG. 3 in step 1 to impersonate a user 305 on the target server 330 to obtain an impersonated user access token 340 for the user 305, and where at least one of the operations received from the user 305 in step 360 comprises a request to access a web page of the target server 330.

In step 2, the management server 310 redirects a web browser of the user 305 to a web application of the target server 330 using a redirect call that comprises the impersonated user access token 340 (generated in step 375 of FIG. 3) and a session cookie (appearing, for example, as if the IDP of the target server 330 issued the callback URL to the user 305 after a successful login). In step 3, the web application of the target server 330 opens to the requested web page in the web browser of the user 305 with the user logged in and ready to perform one or more web operations on the web application.

The process of FIG. 4 may be performed, for example, when a front-end portion of the target server 330 manages the user access token, without relying on a back-end portion of the target server 330.

Figure 5:
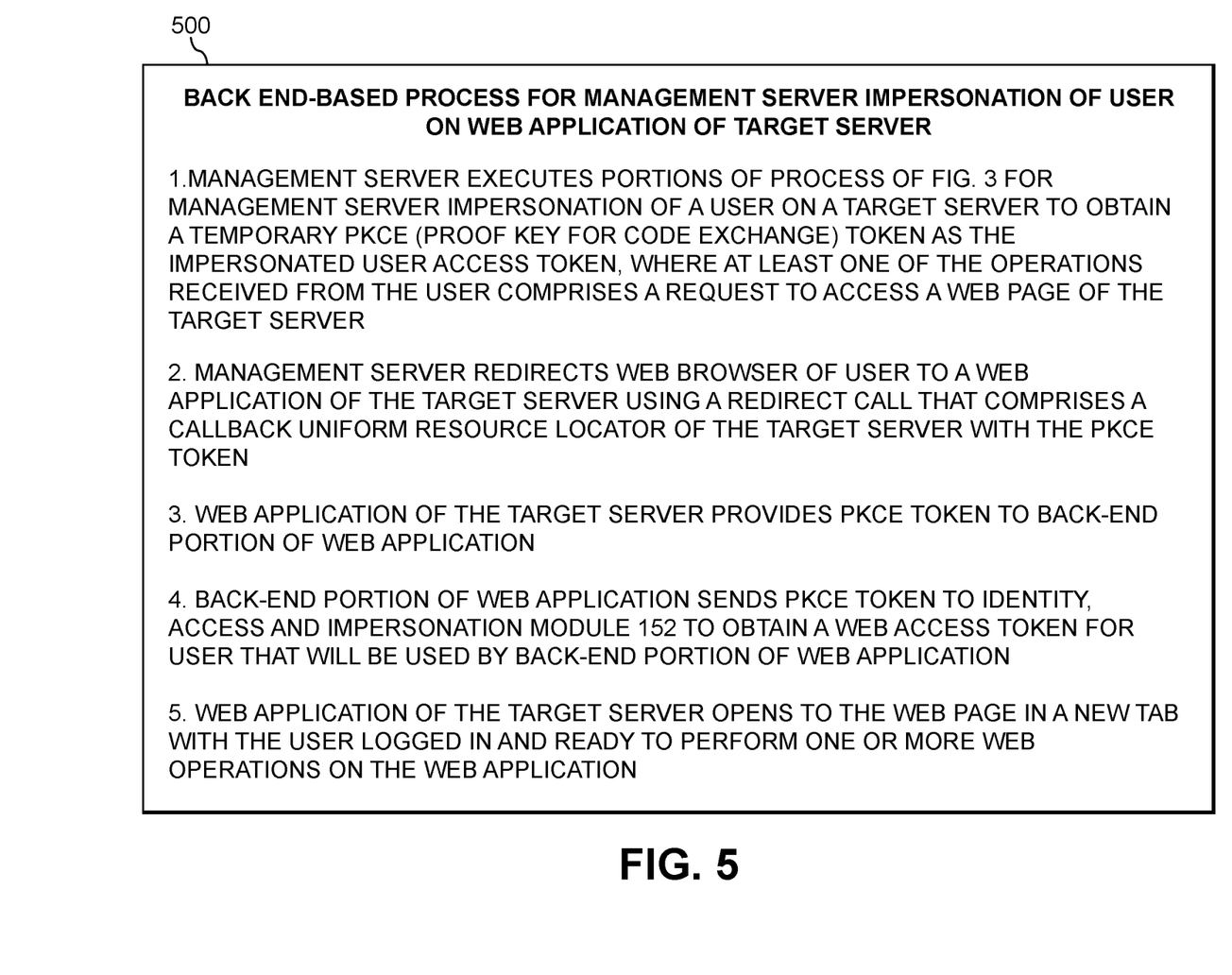
FIG. 5 illustrates exemplary pseudo code for a process for a back end-based management server impersonation of a user on a web application of a target server in accordance with an illustrative embodiment.

FIG. 5 illustrates exemplary pseudo code 500 for a process for a back end-based management server impersonation of a user on a web application of a target server in accordance with an illustrative embodiment. In the example of FIG. 5, the management server 310 executes at least portions of the process of FIG. 3 in step 1 to impersonate a user 305 on the target server 330 to obtain a temporary PKCE token as the impersonated user access token 340, and where at least one of the operations received from the user 305 in step 360 comprises a request to access a web page of the target server 330.

In step 2, the management server 310 redirects a web browser of the user 305 to a web application of the target server 330 using a redirect call that comprises a callback uniform resource locator of the target server 330 with the PKCE token. In step 3, the web application of the target server 330 provides the PKCE token to a back-end portion of the web application and the back-end portion of the web application sends the PKCE token to the identity, access and impersonation module 152 of the target server 330 in step 4 to obtain a web access token for the user 305 that will be used by the back-end portion of the web application In step 5, the web application of the target server 330 opens to the web page (e.g., in a new tab) with the user logged in and ready to perform one or more web operations on the web application The process of FIG. 5 may be performed, for example, when a back-end portion of the target server 330 manages the impersonated user access token 340 of the user, to use a public client PKCE-based login.

Figure 6:
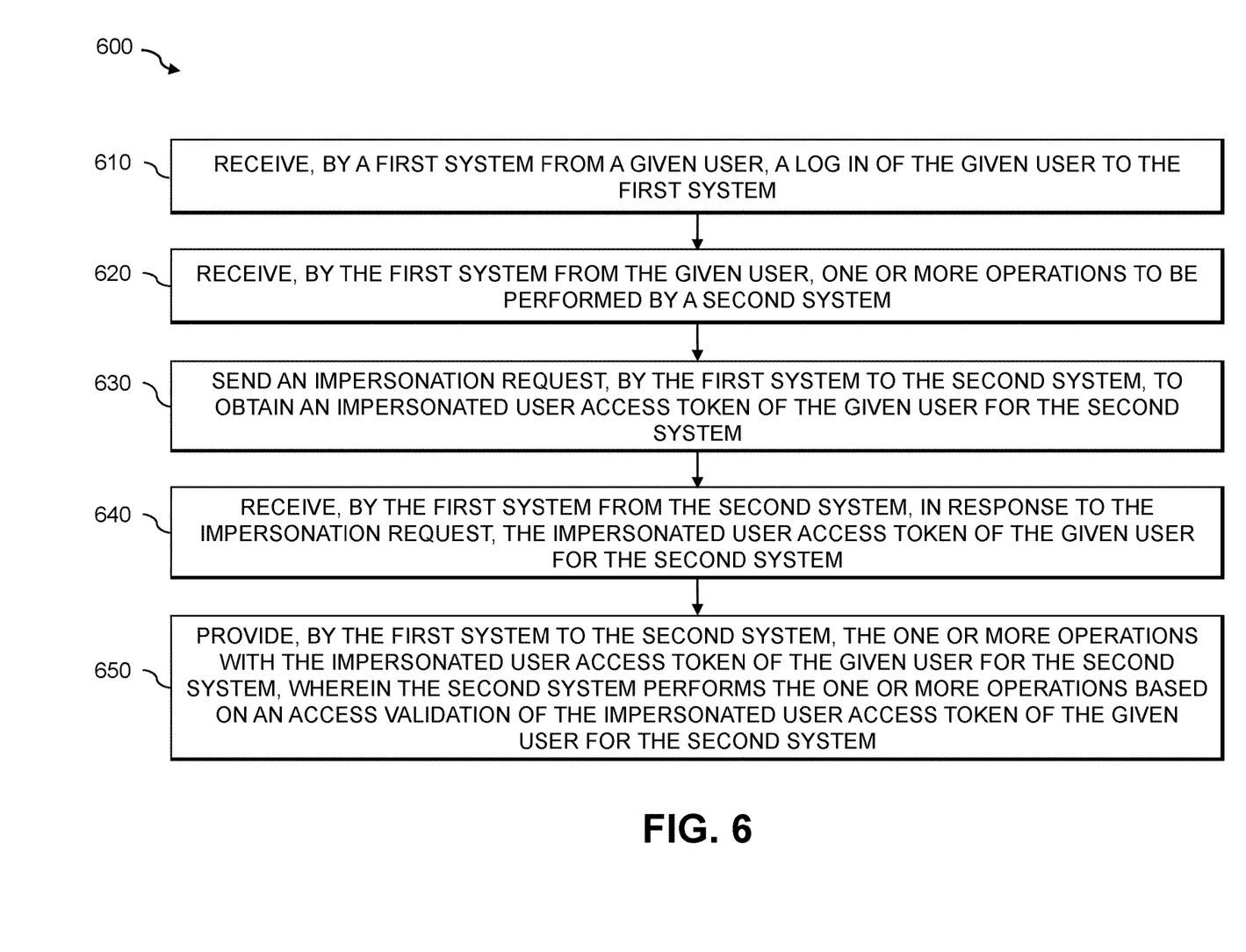
FIG. 6 is a flow diagram illustrating an exemplary implementation of a process for performing user operations by a first system on a second system using user impersonation in accordance with an illustrative embodiment.

FIG. 6 is a flow diagram illustrating an exemplary implementation of a process 600 for performing user operations by a first system on a second system using user impersonation in accordance with an illustrative embodiment. In the example of FIG. 6, the process 600 initially receives in step 610, by a first system (e.g., management server 310) from a given user (e.g., user 305), a log in of the given user to the first system. In step 620, the first system receives, from the given user, one or more operations to be performed by a second system (e.g., target server 330).

In step 630, the process 600 sends an impersonation request, by the first system to the second system, to obtain an impersonated user access token of the given user for the second system. The first system receives from the second system, in step 640, in response to the impersonation request, the impersonated user access token of the given user for the second system. In step 650, the first system provides, to the second system, the one or more operations, and the impersonated user access token of the given user for the second system, wherein the second system performs the one or more operations based at least in part on a result of an access validation of the impersonated user access token of the give user for the second system.

In some embodiments, the first system uses an identity service that is different than an identity service of the second system.

In one or more embodiments, the sending the impersonation request may comprise providing, by the first system to the second system, a first system user access token, issued by the first system in response to the given user logging in to the first system, of the given user. The access validation may further comprise validating an impersonator user access token of the first system that allows the first system to impersonate a plurality of users on the second system and has a duration that exceeds a session of the given user. The impersonated user access token may be cached for one or more additional user operations.

In at least some embodiments, the one or more operations comprise a request of the given user to access a web page on the second system, and the method further comprises redirecting, by the first system, a web browser of the given user to a web application of the second system using a redirect call that comprises the impersonated user access token of the given user and wherein the web application of the second system opens to the web page in the web browser of the given user, such that the given user performs one or more user web operations on the web application.

In addition, the one or more operations may comprise a request of the given user to access a web page on the second system, and wherein the impersonated user access token of the given user comprises a proof key for code exchange token and the method further comprises redirecting, by the first system, a web browser of the given user to a web application of the second system using a redirect call that comprises a callback uniform resource locator of the second system with the proof key for code exchange token, wherein the web application of the second system provides the proof key for code exchange token to a back end portion of the web application of the second system, wherein the back end portion of the web application of the second system sends the proof key for code exchange token to an identity service of the second system to obtain a web access token for the given user, and wherein the web application of the second system opens to the web page in the web browser, such that the given user performs one or more web user operations on the web application of the second system.

The particular processing operations described in conjunction with the exemplary pseudo code of FIGS. 2, 4 and 5, the communication diagram of FIG. 3 and the flow diagram of FIG. 6 are presented by way of illustrative example only, and should not be construed as limiting the scope of the disclosure in any way. Alternative embodiments can use other types of processing operations for performing user operations by a first system on a second system using user impersonation. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed techniques for performing user operations by a first system on a second system using user impersonation may be employed by a first system to impersonate a given user on a second system, for example, without the given user having to log in to the second system. The disclosed user impersonation techniques, in at least some embodiments, allow a manager, portal or another system to perform one or more user operations on at least a second system using user impersonation (e.g., even in the absence of a common IDP).

Among other benefits, the disclosed user impersonation techniques provide an automated method to achieve trust between two different systems. In this manner, the user does not need to manually create trust between the additional systems by logging in to each of the managed systems (at least once). In addition, in some embodiments, a web GUI of a first system can redirect a browser of a user to one or more web GUIs of at least one other system.

In addition, the disclosed techniques for performing user operations by a first system on at least one other system allow the first system to instantiate access to on the at least one other system transparently, without requiring a user to log in into the at least one other system or to use a common identity provider.

One or more embodiments of the disclosure provide improved methods, apparatus and computer program products for performing user operations by a first system on a second system using user impersonation. The foregoing applications and associated embodiments should be considered as illustrative only, and numerous other embodiments can be configured using the techniques disclosed herein, in a wide variety of different applications.

It should also be understood that the disclosed techniques for user impersonation, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for user impersonation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprising cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based user impersonation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based remote learning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
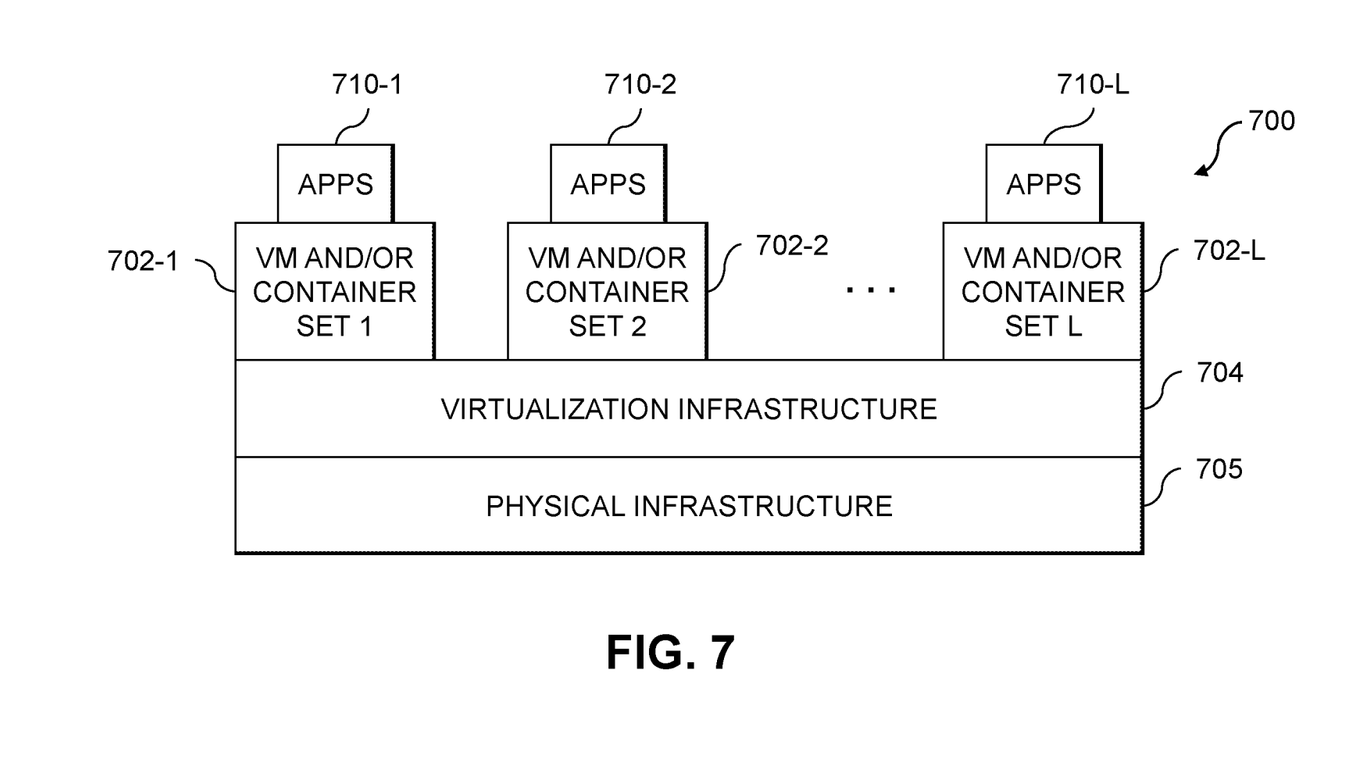
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide user impersonation functionality of the type described above for one or more processes running on a given one of the VMs. For example, each of the VMs can implement user impersonation control logic and associated functionality for allowing a first system to perform user operations on a second system on behalf of a given user.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide user impersonation functionality of the type described above for one or more processes running on different ones of the containers. For example, a container host device supporting multiple containers of one or more container sets can implement one or more instances of user impersonation control logic and associated functionality for allowing a first system to perform user operations on a second system on behalf of a given user.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, a CPU, a GPU, a TPU, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
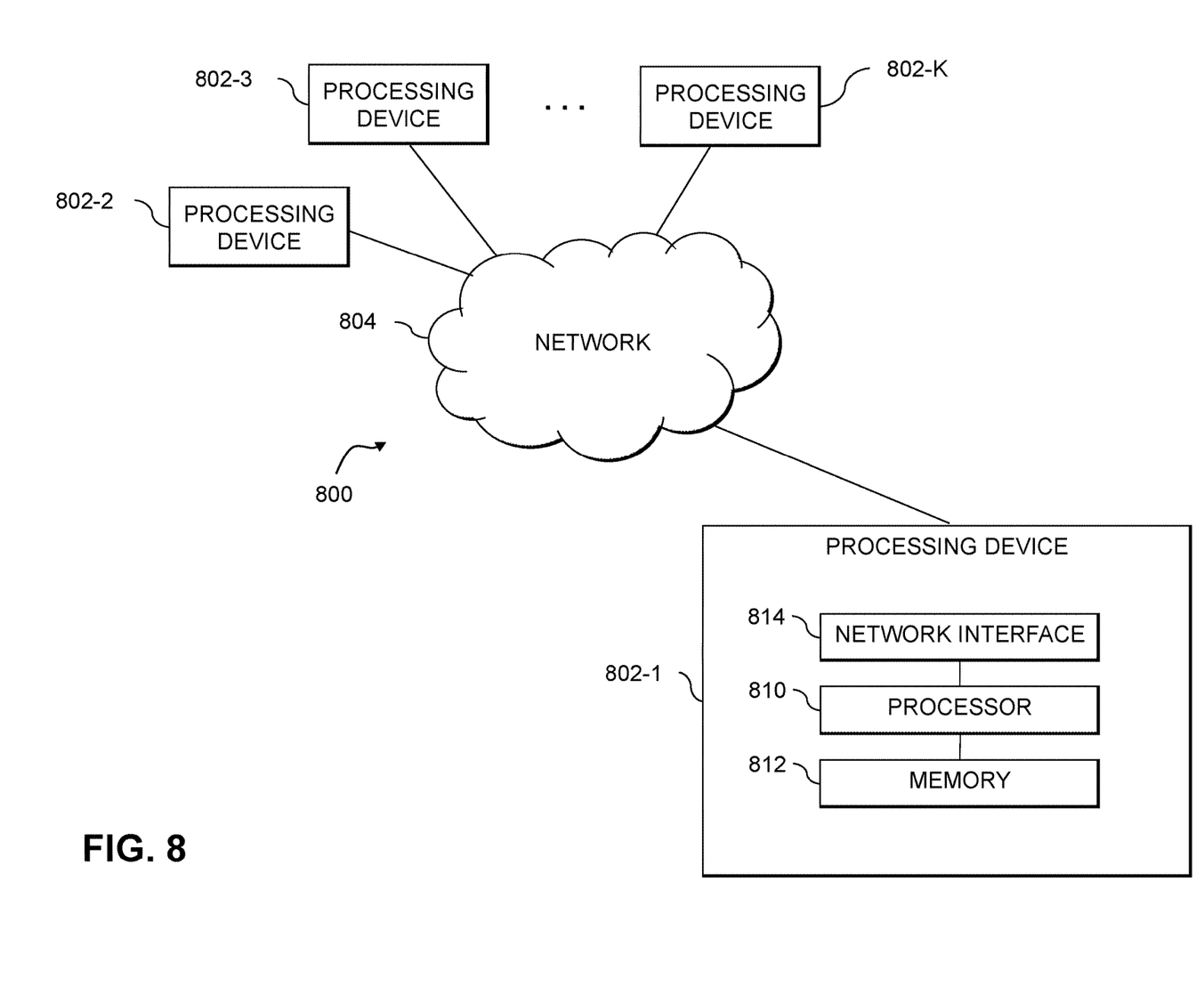
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a portion of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    receiving, by a first system from a given user, a log in of the given user to the first system;
    receiving, by the first system from the given user, one or more operations to be performed by the first system, on behalf of the given user, on a second system;
    sending an impersonation request, by the first system to the second system, to obtain an impersonated user access token of the given user for the second system, wherein the impersonated user access token of the given user allows the first system to perform the one or more operations on the second system on behalf of the given user;
    receiving, by the first system from the second system, in response to the impersonation request, the impersonated user access token of the given user for the second system; and
    providing, by the first system to the second system, the one or more operations, with the impersonated user access token of the given user for the second system, wherein the second system performs the one or more operations based at least in part on a result of an access validation of the impersonated user access token of the given user for the second system, wherein the access validation comprises validating an impersonator user access token of the first system that allows the first system to impersonate a plurality of users on the second system, wherein the impersonator user access token of the first system is distinct from the impersonated user access token of the given user,
    wherein the method is performed by at least one processing device comprising a processor coupled to a memory.

2. The method of claim 1, wherein the first system uses an identity service that is different than an identity service of the second system.

3. The method of claim 1, wherein the sending the impersonation request further comprises providing, by the first system to the second system, a first system user access token, issued by the first system in response to the given user logging in to the first system, of the given user.

4. The method of claim 1, wherein the impersonator user access token of the first system has a duration that exceeds a session of the given user.

5. The method of claim 1, wherein the impersonated user access token is cached for one or more additional user operations.

6. The method of claim 1, wherein the one or more operations comprise a request of the given user to access a web page on the second system, and further comprising redirecting, by the first system, a web browser of the given user to a web application of the second system using a redirect call that comprises the impersonated user access token of the given user and wherein the web application of the second system opens to the web page in the web browser of the given user, such that the given user performs one or more user web operations on the web application.

7. The method of claim 1, wherein the one or more operations comprise a request of the given user to access a web page on the second system, and wherein the impersonated user access token of the given user comprises a proof key for code exchange token, and further comprising redirecting, by the first system, a web browser of the given user to a web application of the second system using a redirect call that comprises a callback uniform resource locator of the second system with the proof key for code exchange token, wherein the web application of the second system provides the proof key for code exchange token to a back end portion of the web application of the second system, wherein the back end portion of the web application of the second system sends the proof key for code exchange token to an identity service of the second system to obtain a web access token for the given user, and wherein the web application of the second system opens to the web page in the web browser, such that the given user performs one or more web user operations on the web application of the second system.

8. The method of claim 1, wherein the given user logs into the first system and initiates a given operation on the first system to be performed on the second system, and wherein the given user does not authenticate to the second system.

9. An apparatus comprising:
at least one processing device comprising a processor coupled to a memory;
the at least one processing device being configured to implement the following steps:
receiving, by a first system from a given user, a log in of the given user to the first system;
receiving, by the first system from the given user, one or more operations to be performed by the first system, on behalf of the given user, on a second system;
sending an impersonation request, by the first system to the second system, to obtain an impersonated user access token of the given user for the second system, wherein the impersonated user access token of the given user allows the first system to perform the one or more operations on the second system on behalf of the given user;
receiving, by the first system from the second system, in response to the impersonation request, the impersonated user access token of the given user for the second system; and
providing, by the first system to the second system, the one or more operations, with the impersonated user access token of the given user for the second system, wherein the second system performs the one or more operations based at least in part on a result of an access validation of the impersonated user access token of the given user for the second system, wherein the access validation comprises validating an impersonator user access token of the first system that allows the first system to impersonate a plurality of users on the second system, wherein the impersonator user access token of the first system is distinct from the impersonated user access token of the given user.

10. The apparatus of claim 9, wherein the first system uses an identity service that is different than an identity service of the second system.

11. The apparatus of claim 9, wherein the sending the impersonation request further comprises providing, by the first system to the second system, a first system user access token, issued by the first system in response to the given user logging in to the first system, of the given user.

12. The apparatus of claim 9, wherein the impersonator user access token of the first system has a duration that exceeds a session of the given user.

13. The apparatus of claim 9, wherein the one or more operations comprise a request of the given user to access a web page on the second system, and further comprising redirecting, by the first system, a web browser of the given user to a web application of the second system using a redirect call that comprises the impersonated user access token of the given user and wherein the web application of the second system opens to the web page in the web browser of the given user, such that the given user performs one or more user web operations on the web application.

14. The apparatus of claim 9, wherein the one or more operations comprise a request of the given user to access a web page on the second system, and wherein the impersonated user access token of the given user comprises a proof key for code exchange token, and further comprising redirecting, by the first system, a web browser of the given user to a web application of the second system using a redirect call that comprises a callback uniform resource locator of the second system with the proof key for code exchange token, wherein the web application of the second system provides the proof key for code exchange token to a back end portion of the web application of the second system, wherein the back end portion of the web application of the second system sends the proof key for code exchange token to an identity service of the second system to obtain a web access token for the given user, and wherein the web application of the second system opens to the web page in the web browser, such that the given user performs one or more web user operations on the web application of the second system.

15. A non-transitory processor-readable storage medium having stored therein program code of one or more software programs, wherein the program code when executed by at least one processing device causes the at least one processing device to perform the following steps:
receiving, by a first system from a given user, a log in of the given user to the first system;
receiving, by the first system from the given user, one or more operations to be performed by the first system, on behalf of the given user, on a second system;
sending an impersonation request, by the first system to the second system, to obtain an impersonated user access token of the given user for the second system, wherein the impersonated user access token of the given user allows the first system to perform the one or more operations on the second system on behalf of the given user;
receiving, by the first system from the second system, in response to the impersonation request, the impersonated user access token of the given user for the second system; and
providing, by the first system to the second system, the one or more operations, with the impersonated user access token of the given user for the second system, wherein the second system performs the one or more operations based at least in part on a result of an access validation of the impersonated user access token of the given user for the second system, wherein the access validation comprises validating an impersonator user access token of the first system that allows the first system to impersonate a plurality of users on the second system, wherein the impersonator user access token of the first system is distinct from the impersonated user access token of the given user.

16. The non-transitory processor-readable storage medium of claim 15, wherein the first system uses an identity service that is different than an identity service of the second system.

17. The non-transitory processor-readable storage medium of claim 15, wherein the sending the impersonation request further comprises providing, by the first system to the second system, a first system user access token, issued by the first system in response to the given user logging in to the first system, of the given user.

18. The non-transitory processor-readable storage medium of claim 15, wherein the impersonator user access token of the first system has a duration that exceeds a session of the given user.

19. The non-transitory processor-readable storage medium of claim 15, wherein the one or more operations comprise a request of the given user to access a web page on the second system, and further comprising redirecting, by the first system, a web browser of the given user to a web application of the second system using a redirect call that comprises the impersonated user access token of the given user and wherein the web application of the second system opens to the web page in the web browser of the given user, such that the given user performs one or more user web operations on the web application.

20. The non-transitory processor-readable storage medium of claim 15, wherein the one or more operations comprise a request of the given user to access a web page on the second system, and wherein the impersonated user access token of the given user comprises a proof key for code exchange token, and further comprising redirecting, by the first system, a web browser of the given user to a web application of the second system using a redirect call that comprises a callback uniform resource locator of the second system with the proof key for code exchange token, wherein the web application of the second system provides the proof key for code exchange token to a back end portion of the web application of the second system, wherein the back end portion of the web application of the second system sends the proof key for code exchange token to an identity service of the second system to obtain a web access token for the given user, and wherein the web application of the second system opens to the web page in the web browser, such that the given user performs one or more web user operations on the web application of the second system.

\* \* \* \* \*